United States Patent [19]

Simon

[11] Patent Number: 5,384,937

[45] Date of Patent: Jan. 31, 1995

[54] FISHPLATES FOR TREILLISWORK COMPOSED OF WELDED WIRE

[75] Inventor: Bernard Simon, Caluire, France

[73] Assignee: Mavil, a french Societe Anonyme, Liernais, France

[21] Appl. No.: 14,236

[22] Filed: Feb. 5, 1993

[30] Foreign Application Priority Data

Feb. 11, 1992 [FR] France ............................ 92 01722

[51] Int. Cl.⁶ ............................................ F16B 2/24
[52] U.S. Cl. ............................. 24/295; 24/563; 403/282; 211/181; 29/897.34
[58] Field of Search .................. 24/293, 294, 295, 563; 403/326, 329, 279, 282; 211/181; 29/897.1, 897.34, 897.35

[56] References Cited

U.S. PATENT DOCUMENTS 1,222,453  4/1917  Otte ............................. 24/295
2,513,105  6/1950  Poupitch ........................ 24/295
5,228,754  7/1993  Rogers .......................... 24/295

FOREIGN PATENT DOCUMENTS 2017070  5/1970  France .
845270  8/1960  United Kingdom ................. 24/295

Primary Examiner—John T. Kwon
Assistant Examiner—James A. Larson
Attorney, Agent, or Firm—Dowell & Dowell

[57] ABSTRACT

Fishplates for welded wire trellisworks which include an angled member having a first arm forming two segments which are separated by an open space with each segment having a clip-shaped profile. A second arm has four tongues therein which are each undulated to form recessed passages with the tongues being separated from one another by open spaces so that one of the open spaces therebetween is opposite the open space between the segment of the first arm.

7 Claims, 6 Drawing Sheets

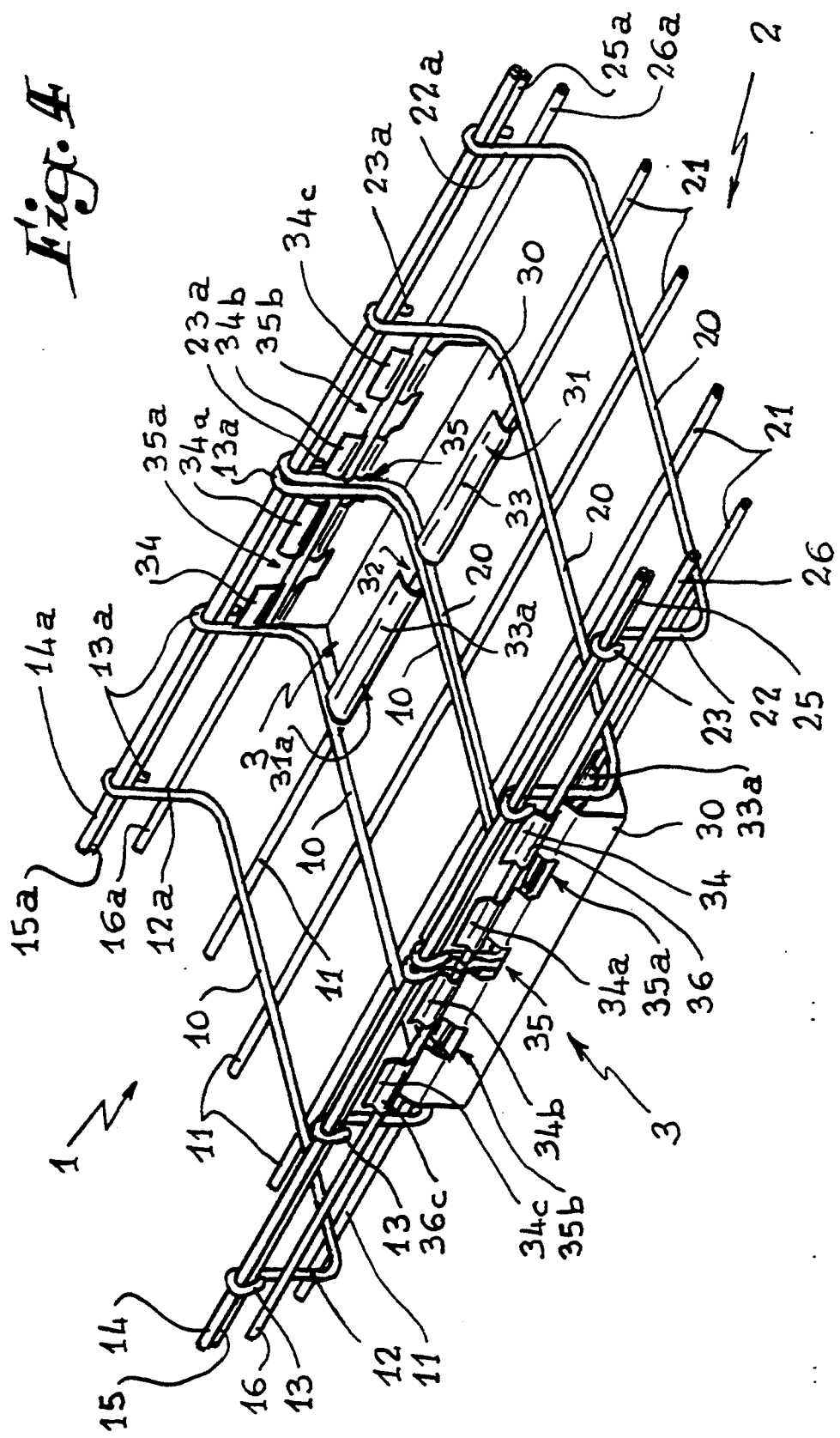

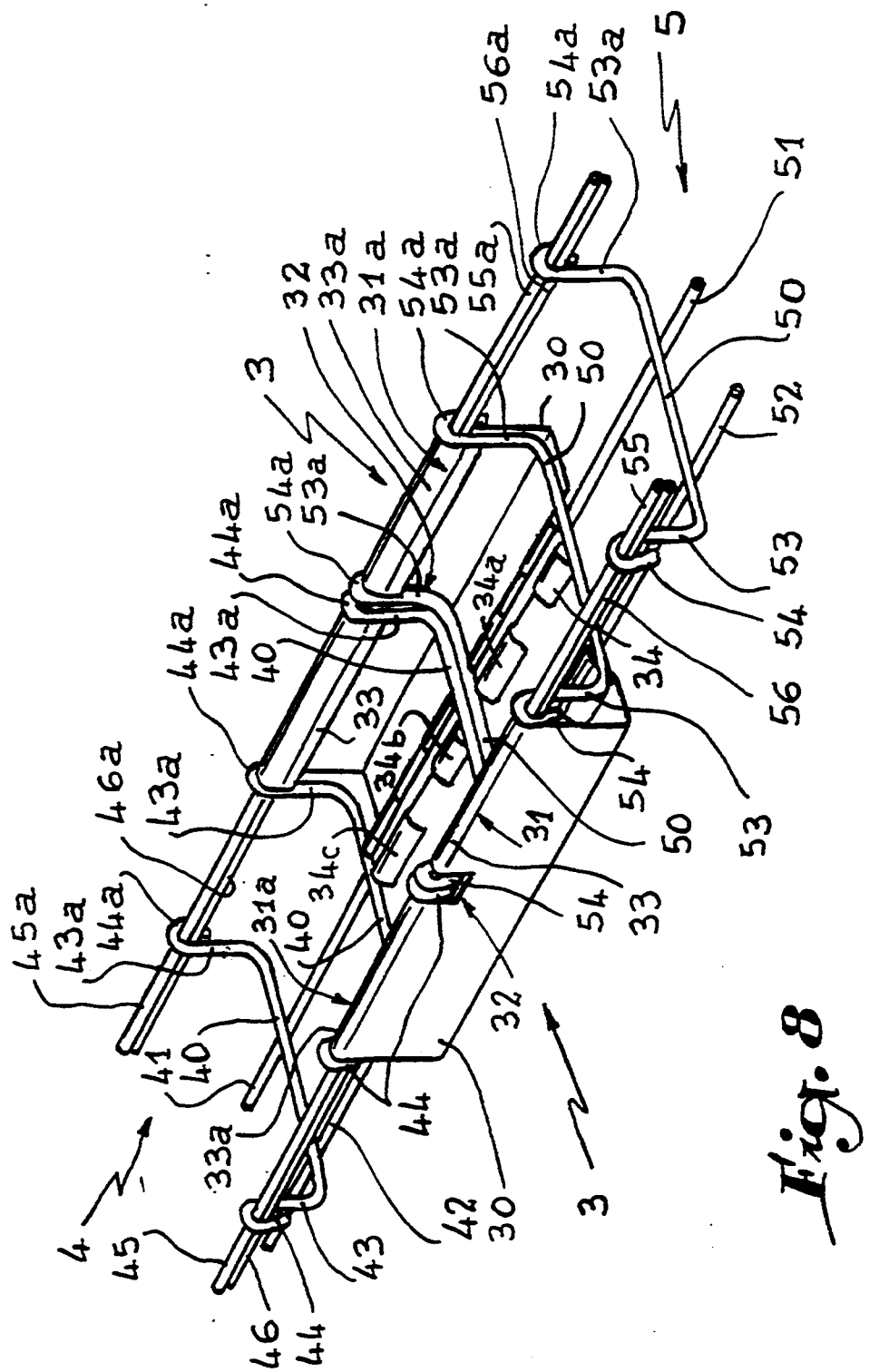

FISHPLATES FOR TREILLISWORK COMPOSED OF WELDED WIRE

BACKGROUND OF THE INVENTION

1. Field of the Invention

The present invention relates to an automatically locking fishplate, which is more particularly intended to join portions or sections of cableway in the form of welded trelliswork, end to end.

2. History of the Related Art

Portions of cableway in the form of welded trelliswork, presenting the form of a gutter and assembled on one another to support various conduits and cables and in particular electric cables, has been known for a long time. Each portion of cableway is constituted by U-shaped transverse wires on which are welded, on the one hand on the bottom, longitudinal wires and, on the other hand on the outside of the branches of the U, marginal wires.

In the present state of the art, screw devices such as fishplates are used for assembling the portions of cableway end to end, which fishplates are disposed on the outside of the branches of the transverse wires and which are maintained by counter-fishplates and bolts.

French Patent Application No. 2 209 219 discloses fishplates which are rigid in their central part and elastic in their end parts. These latter respectively comprise a fold in U-form extended by an inclined tab. These fishplates are installed with the aid of a tool between two longitudinal wires or two marginal wires of two portions of cableway, with the result that each of their ends engages on a transverse wire of each of the two portions.

Such fishplates are made of an elastic material, for example spring steel which, after having been placed in position, does not enable the portions of cableway to be maintained perfectly aligned when they are placed under load. Moreover, the use of a particular tool does not facilitate the use of these fishplates, as they must be considerably elongated in order to be able to look on the transverse wires of the two portions to be joined.

The improvements according to the present invention aim at overcoming the drawbacks set forth hereinabove and at producing a fishplate comprising a particular structure allowing two portions of cableway placed end to end to be automatically locked.

SUMMARY OF THE INVENTION

This particular structure consists of an L-shaped angle of which one of the ends is deformed and cut out to produce two segments of the same dimensions which each have a clip profile, while the second end is cut into four tongues which are each undulated to form a dish-shaped passage.

Another advantage of the fishplate according to the invention is that two portions of cableway are assembled end to end by positioning two fishplates opposite each other on the outside of the portions. The fishplates are introduced between two transverse wires of each portion so that the ends thereof engage, on the one hand, on the marginal wires and, on the other hand, on the longitudinal wires of the portions to be joined.

BACKGROUND OF THE INVENTION

The invention will be .more readily understood on reading the following description with reference to the accompanying drawings, in which:

FIG. 4 is a view in perspective showing the two portions of cableway of large dimensions joined by the fishplates according to the invention.

FIG. 8 is a view in perspective showing two portions of cableway of small dimensions joined by means of the fishplates.

DETAILED DESCRIPTION OF THE INVENTION

Figure 1:
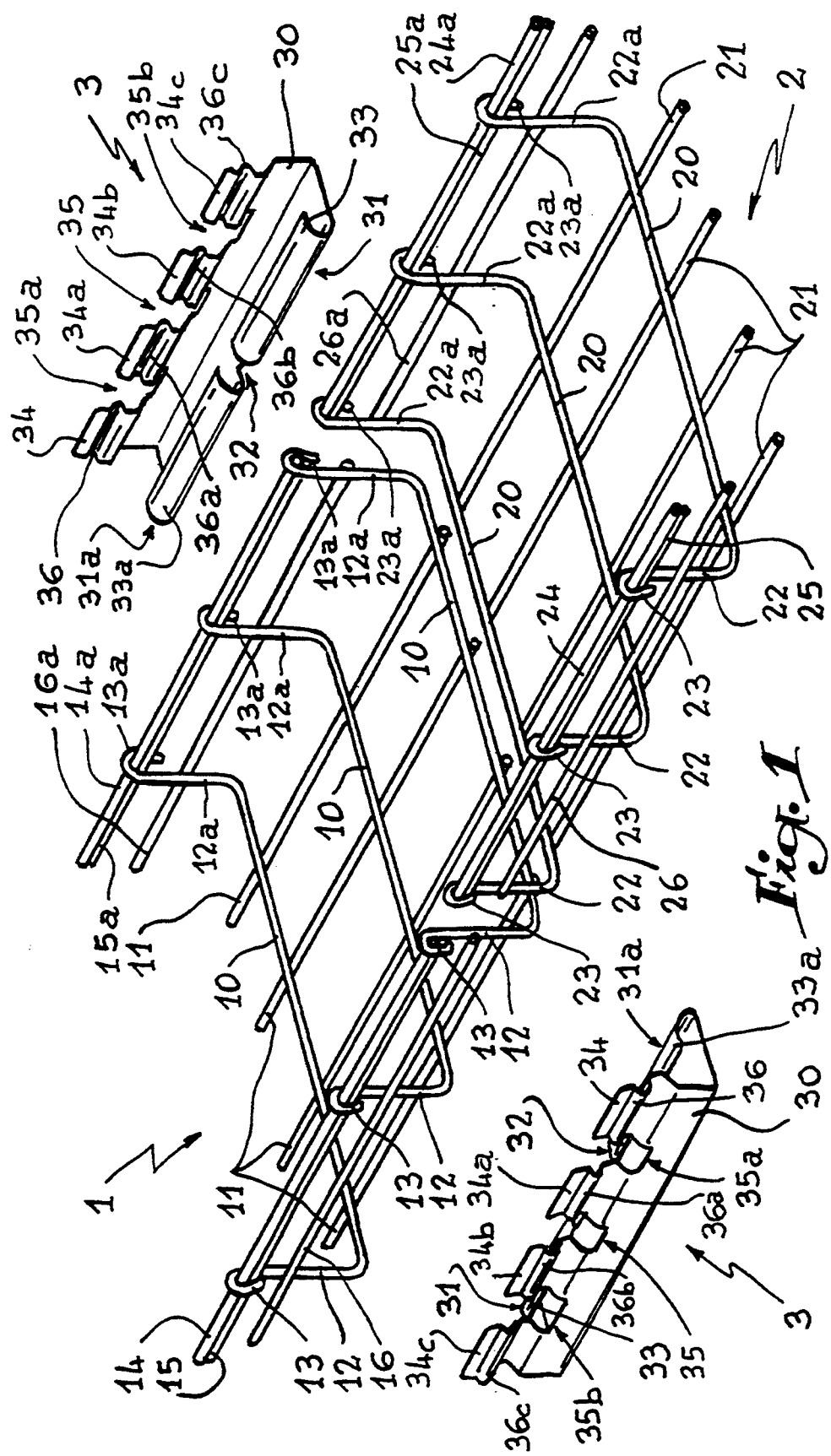
FIG. 1 is an exploded view in perspective partially illustrating two portions of cableway, of a large dimensions, in the form of welded trelliswork, placed end to end and two fishplates according to the invention.

Referring now to the drawings, FIG. 1 shows two portions of sections of cableway 1 and 2 of large dimensions, which are strictly similar and which must be assembled by two identical fishplates 3. Each portion of cableway 1 and 2 comprises a certain number of U-shaped transverse wires 10, 20 joined to one another via longitudinal wire 11, 21 which are welded under the web of the U. The number of longitudinal wires 11, 21 varies depending on the width of the web.

The transverse wires 10, 20 of the portions 1 and 2 comprise lateral branches 12, 12a and 22, 22a whose ends are bent outwardly in the form of hooks 13, 13a and 23, 23a. Inside the folds produced by hooks 13, 13a and 23, 23a of each transverse wire 10, 20 are welded two upper marginal wires 14, 14a; 15, 15a and 24, 24a, 25, 25a of different diameters. Below the hooks 13, 13a and 23, 23a is welded another marginal wire 16, 16a and 26, 26a adapted to consolidate the assembly of the portions of cableway 1 and 2 of large dimensions.

The ends of each portion of cableway 1 and 2 are joined via two identical fishplates 3 having a particular structure for automatically locking the portions. The particular structure consists in an angle 30 in L-form of which one of the arms is cut out into two segments of equivalent dimensions 31, 31a so as to form an open space 32 of a determined width and symmetrical with respect to the transverse axis of the angle 30. The segments 31, 31a are bent into clips 33, 33a whose function will be seen more readily hereinbelow.

The second arm of the angle 30 is cut out into four successive tongues 34, 34a, 34b, 34c, of the same configuration, between which are provided open spaces 35, 35a and 35b of which at least one, and preferably space 35, is of a dimension identical to at of the space 32 and disposed opposite thereto.

Tongues 34, 34a, 34b, 34c are undulated to form dish-shaped or recessed passages 36, 36a, 36b, 36c which are coaxial so as to be aligned lengthwise of the angle 30. It is observed that, for each segment 33, 33a there correspond respectively two tongues 34, 34a and 34b, 34c which are distributed symmetrically with respect to the transverse axis of the open spaces 32 and 35, as will be seen more readily hereinbelow.

Figure 2:
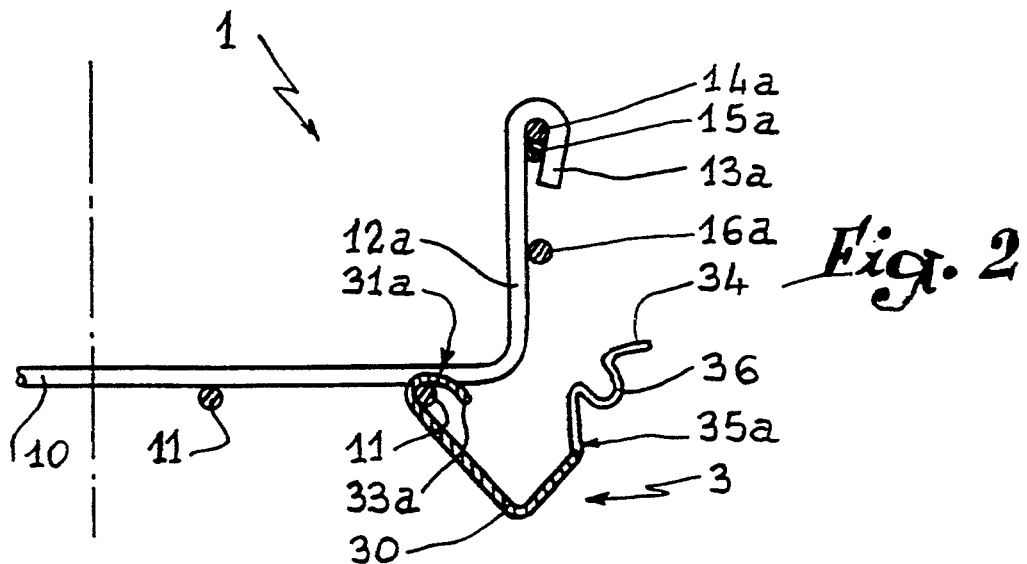
FIGS. 2 and 3 are partial sections representing the successive steps of positioning the fishplates for assembling the two portions of cableway of large dimensions.
Figure 3:
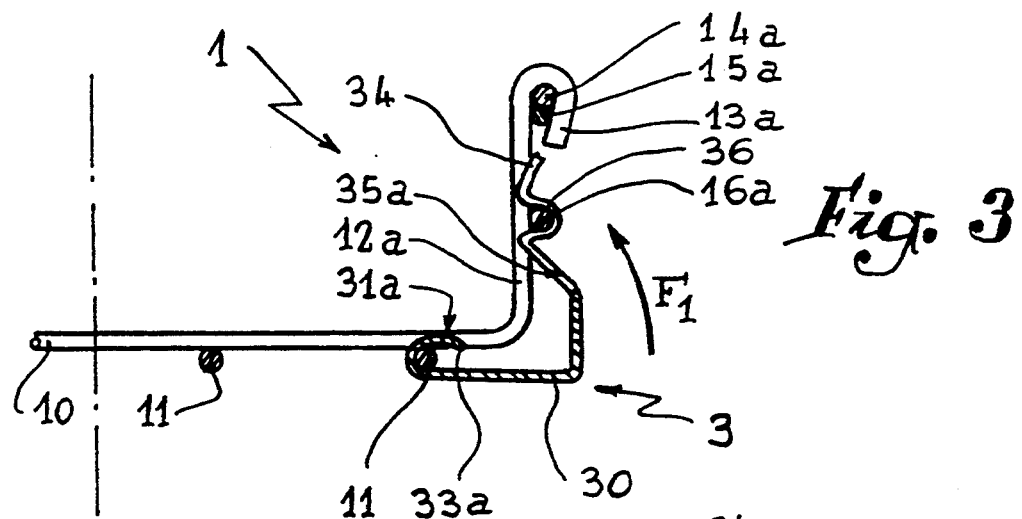

FIGS. 2 and 3 represent the successive steps of positioning the fishplates 3 opposite one another on the outer side of each portion of cableway 1 and 2 to join them. For reasons of clarity and to facilitate understanding, these Figures represent the positioning of one fishplate 3 on the outer side of one portion, and preferably the one referenced 1, it being understood that the fishplate is fixed simultaneously on the two portions.

The fishplates 3 are positioned on the outer side of the portions of cableway 1 and 2 according to the invention in the following manner:

Once two portions of cableway 1 and 2 have been placed end to end, a fishplate 3 is presented obliquely (FIG. 2), its clip 33a belonging to segment 31a is hooked to the longitudinal wire 11 located nearest the outer edge of the portion 1. The fishplate 3 is then pivoted in the direction of arrow F1 so that the corresponding tongue 34 is located near the marginal wire 16a (FIG. 3). Finally, by elastic deformation of the tongue 34, the marginal wire 16a is engaged by force inside the recess 36 in order to clip just below the hook 13a of the transverse wire 10 of the portion of cableway 1 (FIG. 3).

For each cableway 1 and 2, two fishplates 3 are positioned opposite each other, as indicated hereinabove, to establish the connection illustrated in FIG. 4.

It will further be noted in FIG. 4 that the end transverse wires 10 and 20 of each portion 1 and 2 cooperate with the open spaces 32 and 35 of the angle 30. The ends of the segments 31, 31a and the tongues 34a, 34b respectively bordering the open spaces 32 and 35 make it possible to retain the end transverse wires 10 and 20 laterally, in the event portions 1 and 2 are moved.

Figure 5:
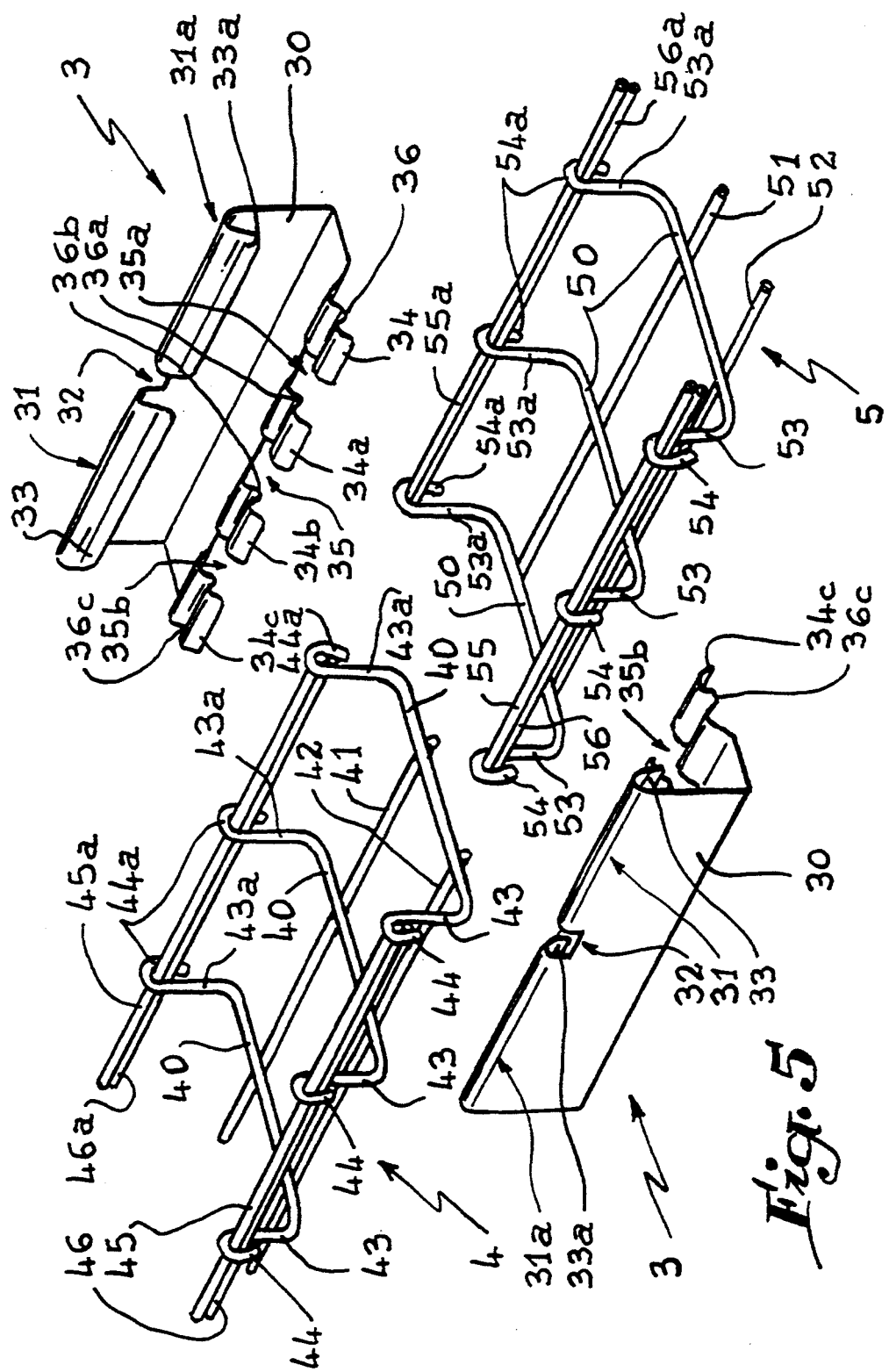
FIG. 5 is a view in perspective similar to that of FIG. 1, but illustrating two portions of cableway, of small dimensions, in the form of welded trelliswork, placed end to end with a view to assembly thereof by means of the fishplates according to the invention.

FIG. 5 shows two portions of cableway 4 and 5 of small dimensions which are to be assembled end to end by means of two fishplates 3 placed opposite each other, as described hereinabove.

Each portion of cableway 4 and 5 comprises a certain number of transverse wires 40, 50 in U-form, connected to one another via two longitudinal wires 41, 42 and 51, 52 which are welded beneath the web of the U.

The transverse wires 40 and 50 of the portions 4 and 5 comprise lateral branches 43, 43a and 53, 53a whose ends are bent outwardly in the form of hooks 44, 44a and 54, 54a. Inside the folds made by the hooks 44, 44a and 54, 54a of each transverse wire 40 and 50, are welded two upper marginal wires 45, 45a; 46, 46a and 55, 55a; 56, 56a of different diameters.

Figure 6:
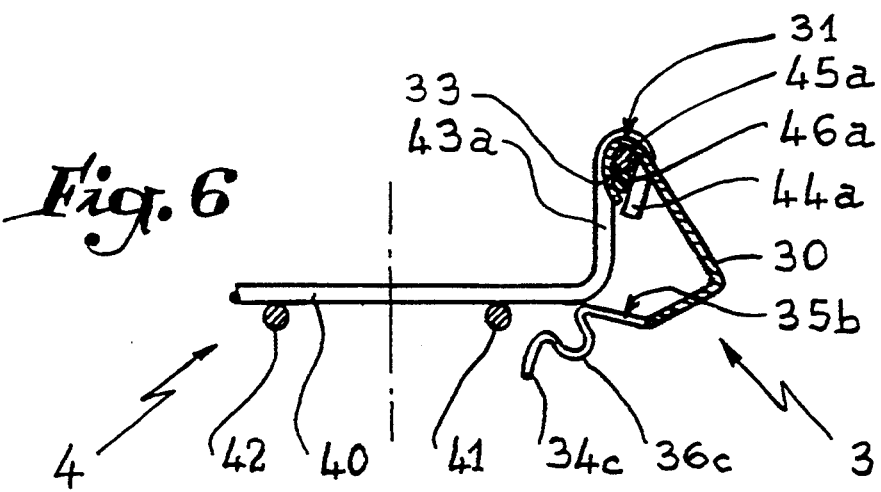
FIGS. 6 and 7 are partial sections representing the successive steps oil positioning the fishplates for assembling the two portions of cableway of small dimensions.
Figure 7:
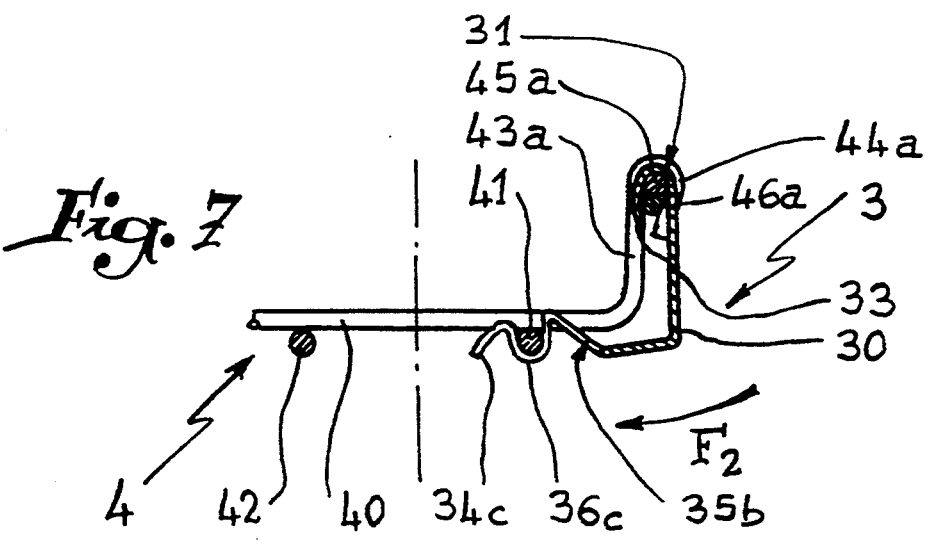

FIGS. 6 and 7 represent the successive steps of positioning the fishplates 3 opposite each other on the outer side of each portion of cableway 4 and 5 to join them.

Once two portions of cableway 4 and 5 have been placed end to end, a fishplate 3 is presented obliquely (FIG. 6), so that, for example, its clip 33 belonging to segment 31 is hooked on the marginal wires 45a, 46a. The fishplate 3 is then rotated in the direction of arrow F2 so that the corresponding tongue 34c comes in the vicinity of the longitudinal wire 41. Finally, by elastic deformation of the tongue 34c, the longitudinal wire 41 is engaged by force inside the recessed passageway 36a in order to clip and join the portions of cableway.

For each section of cableway 4 and 5, two fishplates 3 are positioned opposite each other, as indicated hereinabove, to obtain the connection illustrated in FIG. 8.

It will also be noted in FIG. 8 that the end transverse wires 40 and 50 of each portion of cableway 4 and 5 cooperate with the open spaces 32 and 35 of the angle 30. Consequently, the ends of the segments 31, 31a and of tongues 34a and 34b respectively bordering the open spaces 32 and 35 make it possible to retain the end transverse wires 40 and 50 laterally in the case of the portions 4 and 5 moving.

It will be noted that the same fishplate 3 is used for fixing portions of cableway 1, 2 and 4, 5, and this by a double rotation of the fishplate in order to be able to offer it in the two positions (FIGS. 1 and 5).

Figure 9:
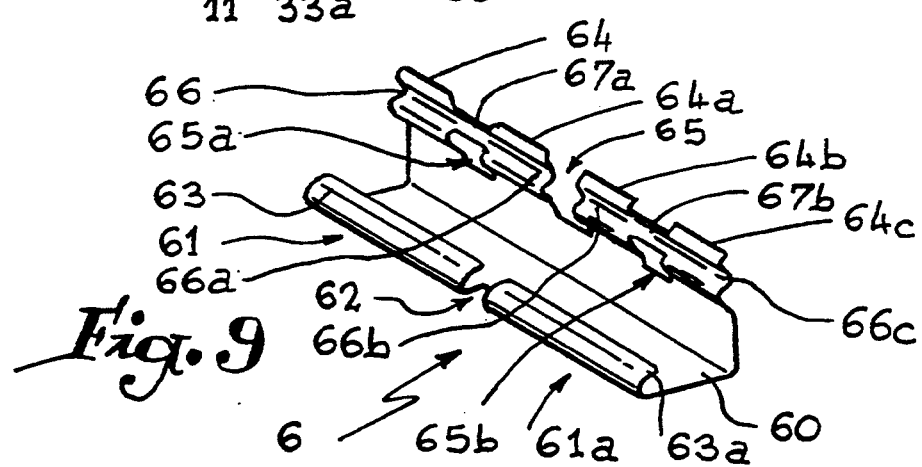
FIG. 9 is a view in perspective illustrating another embodiment of a fishplate according to the invention.

FIG. 9 shows another embodiment, referenced 6, of the fishplate 3, constructed from an angle 60 of which one of the arms has two segments 61, 61a of the same dimensions cut out therein, so as to form an open space 62 of a determined width.

Segments 61 and 61a present a profile 63, 63a in clip form, which makes it possible to hook the fishplate 6 on the portions of cableway, as described hereinbefore. The second arm of the angle 60 has four tongues 64, 64a, 64b, 64c of the same configuration cut out therein, which are separated by open spaces 65, 65a, 65b, of which at least one, preferably the one referenced 65, has dimensions identical to those of the open space 62 and disposed opposite thereto in order to be able to receive the end transverse wires of each portion of cableway. Tongues 64, 64a, 64b, 64c are undulated to form dish-shaped recessed passages 66, 66a, 66b, 66c. These passages are coaxial so as to be aligned lengthwise of the angle 60. The open spaces 65a and 65b are closed in their upper parts by curved bands 67a and 67b which join, on the one hand, recess passageway 66 with recess passageway 66a and, on the other hand, recess passageway 66b with recess passageway 66c.

The process for positioning the fishplate 6 for portions of cableway of large dimensions or of small dimensions remains identical to that described hereinabove.

It must, moreover, be understood that the foregoing description has been given only by way of example and that it in no way limits the domain of the invention which would not be exceeded by replacing the details of execution described by any other equivalents.

What is claimed is:

1. A fishplate for assembling portions of cableway constituted in particular by trellisworks of welded metal wires, the fishplate comprising, an angle member having a first arm having two segments of the same dimensions which are separated by an open space, each of said segments defining a clip, said angle member having a second arm having four tongues, each of said tongues being undulated to form a reccessed passage, the said tongues being separated from one another by second open spaces so that said open space between said segments is opposite one of said second open spaces separating two of said tongues.

2. A process for joining portions of cableway in the form of welded trelliswork, employing the fishplate of claim 1, the trelliswork including transverse wires having upwardly extending branches, longitudinal wires joined to the transverse wires in spaced relationship from the branches and marginal sires joined to the branches, the longitudinal and marginal wires being generally parallel, portions having ends the process comprising the following steps of:

placing two portions of cableway end to end;

offering a first fishplate so that said clips of said segments are hooked on the longitudinal wires located adjacent the end of each portion;

pivoting the first fishplate so that said tongues are located respectively adjacent the marginal wires of each portion; and clipping the marginal wires inside said recessed passages of each tongue so that the end transverse wires of the portions extend within one of said second open spaces.

3. The process of claim 2, including the additional step of joining the two portions of cable way with a second fishplate disposed opposite the first fishplate.

4. A fishplate for assembling portions of cableway in the form of welded trelliswork, the fishplate comprising, an angle having a first arm cut into two segments of the same dimensions which segments are separated by a first open space, each of said segments defining a clip, said angle having a second arm having four tongues cut out therein which are each undulated to form recessed passages, said tongues being separated from one another by second open spaces, at least two of said tongues being connected by curved bands which connect the said recessed passage thereof together, and said second open space between two of said tongues opposite said first open space between said segments.

5. A fishplate for assembling portions of cableway constituted by trellisworks of welded metal wires, the fishplate comprising, an angle member having a first arm having segments which are separated by a first open space, each of said segments having a clip, said angle member having a second arm having a plurality of tongues, each of said tongues being undulated to form a recessed passageway, said tongues being separated from one another by second open spaces so that said first open space between said segments is opposite one of said second open spaces separating two of said tongues.

6. A process for joining portions of cableway in the form of welded trelliswork employing the fishplate of claim 5, wherein the trelliswork has transverse wires including upwardly extending branches, longitudinal wires joined to the transverse wires in spaced relationship from the branches and marginal wires joined to the branches, the longitudinal and marginal wires being generally parallel, and the portions having ends, comprising the steps of:

placing two portions of cableway end to end;

offering a first fishplate so that said clips of said segments are hooked on the longitudinal wires located adjacent the end of each portion;

pivoting the first fishplate so that said tongues are located respectively adjacent the marginal wires of each portion; and clipping the marginal wires inside said recess passage of each tongue so that the end transverse wires of the portions extend within said second open spaces.

7. The process of claim 6 including the additional step of joining the two portions of cableway with a second fishplate disposed opposite to said first fishplate.

* * * * *